United States Patent
Hilgers et al.

(10) Patent No.: US 8,637,157 B2
(45) Date of Patent: *Jan. 28, 2014

(54) COPOLYCARBONATES, THEIR DERIVATIVES AND THE USE THEREOF IN SILICONE HARDCOAT COMPOSITIONS

(75) Inventors: Christoph Hilgers, Pulheim (DE); Anantharaman Dhanabalen, Bangalore (IN); Narayana Padmanabha Iyer, Bangalore (IN); Shayne Joseph Landon, Ballston Lake, NY (US)

(73) Assignee: Momentive Performance Materials Inc., Albany, NY (US)

( * ) Notice: Subject to any disclaimer, the term of this patent is extended or adjusted under 35 U.S.C. 154(b) by 298 days.

This patent is subject to a terminal disclaimer.

(21) Appl. No.: 13/036,307

(22) Filed: Feb. 28, 2011

(65) Prior Publication Data

US 2012/0219802 A1 Aug. 30, 2012

(51) Int. Cl.
*B32B 27/36* (2006.01)
*B32B 27/40* (2006.01)
*C08G 64/02* (2006.01)

(52) U.S. Cl.
USPC ........ 428/412; 428/423.1; 524/370; 524/590; 525/464; 525/467

(58) Field of Classification Search
USPC ........ 428/423.1, 412; 524/370, 590; 525/464, 525/467
See application file for complete search history.

(56) References Cited

U.S. PATENT DOCUMENTS

| | | | |
|---|---|---|---|
| 4,373,060 A | 2/1983 | Ching | |
| 4,373,061 A | 2/1983 | Ching | |
| 4,395,461 A | 7/1983 | Ching | |
| 4,495,360 A | 1/1985 | Anthony | |
| 4,680,232 A | 7/1987 | Factor et al. | |
| 5,041,313 A | 8/1991 | Patel | |
| 5,041,494 A | 8/1991 | Franke et al. | |
| 5,133,742 A * | 7/1992 | Pinchuk | 623/1.54 |
| 5,158,854 A | 10/1992 | Imamura et al. | |

(Continued)

FOREIGN PATENT DOCUMENTS

| | | |
|---|---|---|
| EP | 576166 | 12/1993 |
| EP | 0302712 | 11/1996 |

(Continued)

OTHER PUBLICATIONS

Akimoto, M., et al., "Coating agent compositions for motor vehicle", Database WPI, Thomson Scientific, London, GB; AN 2006-544984, XP002676375, and JP 2006-206774 A (Nippon Polyurethane Kogyo KK) Aug. 10, 2006) Abstract.

*Primary Examiner* — Thao T. Tran
(74) *Attorney, Agent, or Firm* — Dominick G. Vicari; Joseph S. Ostroff; Wiggin and Dana LLP

(57) ABSTRACT

Disclosed herein are novel copolycarbonates containing repeating units A and B respectively of the formulae: (A) —[$R_1OC(=O)O$]—, and (B) —[($R_2O$)n-C(=O)—O]—, wherein the molar ratio of units (A) to units (B) is in the range of from about 9:1 to about 1:9, and wherein $R_1$ is a divalent C8 to C12 alicyclic group, and $R_2$ is ethylene or propylene, and n is an integer ranging from 4 to 40. Also disclosed are silicone hardcoat compositions containing the copolycarbonates and their derivatives. Upon cure, these silicone hardcoat compositions exhibit improved flexibility as compared to that of the conventional hardcoats while at the same time maintain the abrasion resistance of conventional silicone hardcoats.

21 Claims, 2 Drawing Sheets

¹H NMR spectra of silylated CHDM-PPG copolycarbonate diol

(56) References Cited

U.S. PATENT DOCUMENTS

| | | | |
|---|---|---|---|
| 5,344,879 A * | 9/1994 | Inoue et al. | 525/100 |
| 5,349,002 A | 9/1994 | Patel | |
| 5,376,720 A | 12/1994 | Ando | |
| 5,411,807 A | 5/1995 | Patel et al. | |
| 5,503,935 A | 4/1996 | Patel | |
| 5,554,686 A | 9/1996 | Frisch, Jr. et al. | |
| 6,313,335 B1 | 11/2001 | Roberts et al. | |
| 6,448,331 B1 | 9/2002 | Ioka et al. | |
| 6,703,442 B1 | 3/2004 | Ando et al. | |
| 6,723,936 B2 * | 4/2004 | Ootsuka et al. | 200/517 |
| 7,994,250 B2 * | 8/2011 | Origuchi et al. | 524/457 |
| 2007/0212548 A1 | 9/2007 | Lefaux | |
| 2008/0057316 A1 | 3/2008 | Landon et al. | |
| 2012/0219803 A1 * | 8/2012 | Mallesha et al. | 428/412 |

FOREIGN PATENT DOCUMENTS

| | | |
|---|---|---|
| EP | 0877068 | 4/1998 |
| GB | 2350838 A | 12/2000 |
| JP | 11323153 | 11/1999 |
| WO | WO2004/112482 A2 | 12/2004 |
| WO | WO 2007/037824 | 4/2007 |
| WO | WO2011/021500 A1 | 2/2011 |

* cited by examiner

COPOLYCARBONATES, THEIR DERIVATIVES AND THE USE THEREOF IN SILICONE HARDCOAT COMPOSITIONS

FIELD OF INVENTION

The present invention relates to copolycarbonates. More particularly, it relates to novel copolycarbonate diols having alicyclic and polyether repeating units. The present invention is also concerned with the use of above-mentioned copolycarbonate diols and their derivatives as a novel component for curable silicone hardcoat compositions.

BACKGROUND OF THE INVENTION

Polymeric materials, particularly thermoplastics such as polycarbonate, are promising alternatives to glass for use as structural material in a variety of applications, including automotive, transportation and architectural glazing applications, where increased design freedom, weight savings, and improved safety features are in high demand. Plain polycarbonate substrates, however, are limited by their lack of abrasion, chemical, UV and weather resistance, and therefore need to be protected with optically transparent coatings that alleviate above limitations in the aforementioned applications.

Thermal curable silicone hardcoats have been widely used to protect thermoplastic substrates. Typically, the coated substrates are made by initially priming the substrate with an acrylate based primer coat, followed by the application of a silicone hardcoat composition to the primed substrate. Primerless hardcoat compositions have also been developed which allow the coating compositions be applied directly onto unprimed thermoplastic substrates. See for example U.S. Pat. No. 5,349,002 to Patel et al.

While silicone hardcoats are useful in improving the abrasion resistance and weatherbility of thermoplastics, they are typically rigid due to the relatively high cross-linked nature of the cured silicone coating composition. Accordingly, bending of the thermoplastic sheets coated with silicone hardcoat beyond certain extent often leads to cracks/micro-cracks in the hardcoat, which makes these silicone hardcoat less desirable for certain applications.

Efforts have been made to improve the flexibility of silicone hardcoats either by lowering their cross-linking density or by adding an organic polymeric additive to the hardcoat compositions.

Addition of a suitable additive into the silicone hardcoat formulation seemed to be an easy option. But the identification of such an additive is not straightforward, since such additive should satisfy a number of different criteria, namely, (1) being polymeric and soluble in solvents used in the silicone hardcoat formulations, (2) having the ability to become part of the cross-linked network of the silicone hardcoats, (3) not affecting the cross-linking reaction between the components of typical silicone hardcoat compositions, and most importantly, (4) not affecting typical silicone hardcoat properties.

Heretofore, many additives disclosed in the art are less than satisfactory since the incorporation of these additives often leads to inferior abrasion resistance performance of the silicone hardcoats.

Accordingly, there is a need for a new additive that is effective to improve the flexibility of the conventional silicone hardcoats while at the same time, does not adversely affect the abrasion resistance, weatherability and other physical properties of conventional silicone hardcoats. The present invention provides an answer to that need.

SUMMARY OF THE INVENTION

In one aspect, the present invention relates to a polycarbonate comprising repeating units A and B respectively of the formulae:

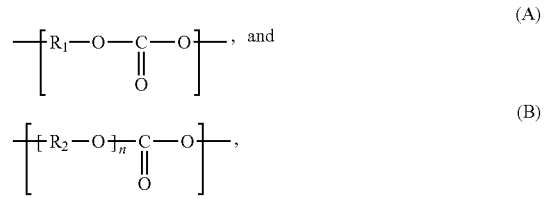

wherein the molar ratio of units (A) to units (B) is in the range of from about 9:1 to about 1:9, and wherein $R_1$ is a divalent C8 to C12 alicyclic group, $R_2$ is a divalent group selected from the group consisting of ethylene and propylene, n is an integer ranging from 4 to 40. The copolycarbonate can be a diol. Optionally, the diol is partially or fully silylated.

In another aspect, the present invention relates to a polyurethane obtained by the reaction of a polyisocyanate and a copolycarbonate diol as described above. Optionally, this polyurethane can be partially or fully silylated.

In yet another aspect, the present invention relates to a coating composition containing a copolycarbonate and its derivatives as described above. Preferably, the coating composition also contains a partial condensate of an organoalkoxysilane, and colloidal silica in addition to the copolycarbonate. Advantageously, the coating composition can be coated directly onto an unprimed polymeric substrate.

In still another aspect, the present invention relates to an article coated with the coating composition of the invention. The hardcoats on the coated articles according to the invention exhibit improved flexibility as compared to that of the conventional hardcoats while at the same time maintain the abrasion resistance of conventional silicone hardcoats.

These and other aspects will become apparent upon reading the detailed description of the invention.

DETAILED DESCRIPTION OF THE PREFERRED EMBODIMENTS

Figure 1:
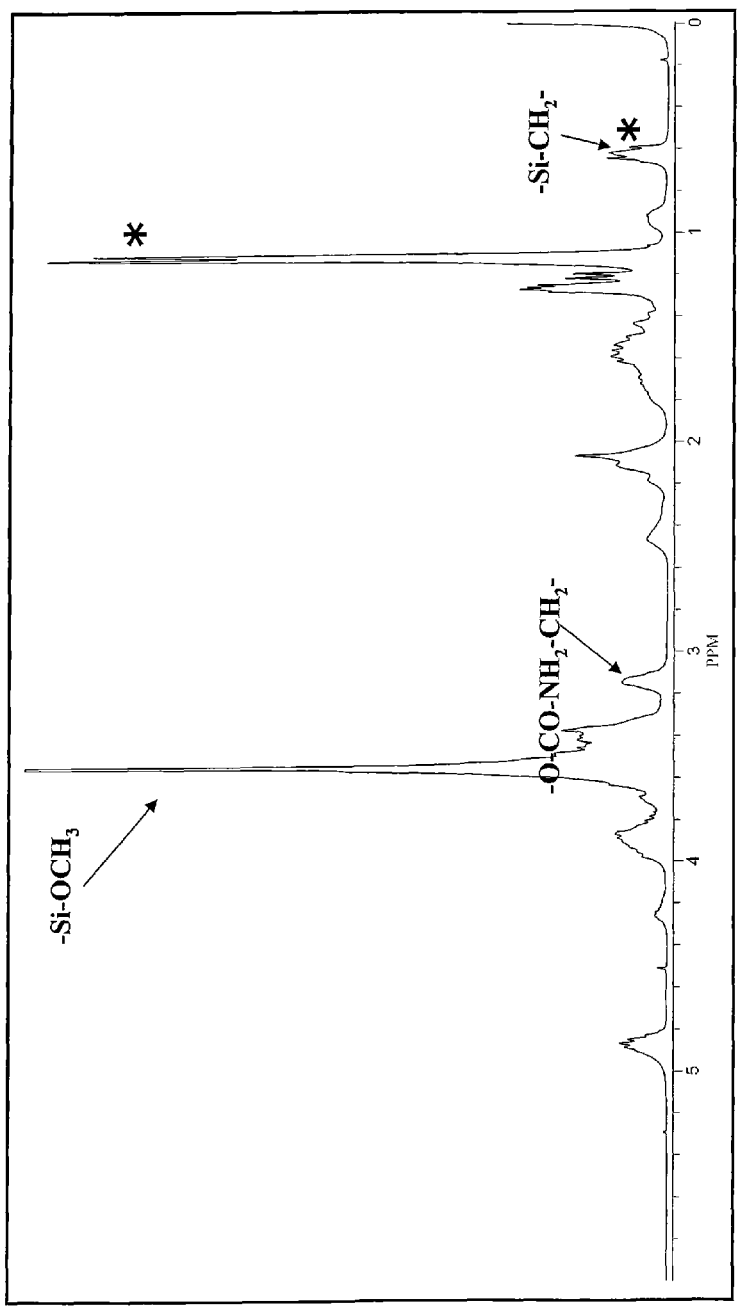
FIG. 1 is a $^1$H NMR spectra of CHDM-PPG copolycarbonate diol

In one embodiment of the invention, there is provided a copolycarbonate comprising repeating units A and B respectively of the formulae:

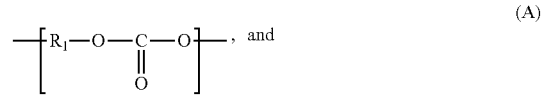

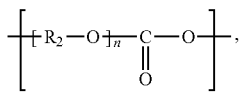
(B)

wherein $R_1$ is a divalent C8 to C12 alicyclic group, $R_2$ is a divalent group selected from the group consisting of ethylene and propylene, n is an integer ranging from 4 to 40. In the copolycarbonate, repeating units (A) and (B) are present at a molar ratio ranging from about 1:9 to about 9:1, preferably, from about 1:3 to about 3:1, more preferably at a ratio of about 1:1. The molecular weight of the copolycarbonate is from about 500 to about 10K, preferably from about 1 to about 2K with respect to polystyrene standard.

As used herein, an alicyclic group is a non-aromatic group or unit. Preferably an alicyclic group is a non-aromatic carbocyclic or heterocyclic group and represents for example ring systems having from 6 to 10 carbon atoms. Exemplary divalent alicyclic group suitable for use as $R_1$ in repeating unit A is

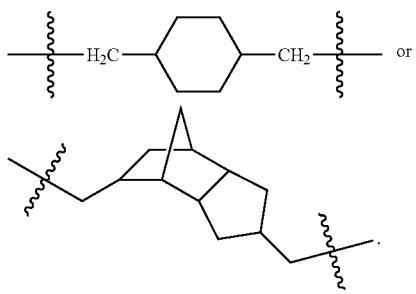

The copolycarbonate of the invention contains terminal groups. Each terminal group is a member selected from the group consisting of a hydroxyl group, and a substituted silyl group of the formula:

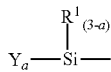

(Formula I)

wherein $R^1$ is a monovalent hydrocarbon residue having 1 to 10 carbon atoms, preferably, from 1 to 3 carbon atoms, each Y is independently a member selected from the group consisting of a halogen atom, an alkoxy group having 1 to 10 carbon atoms, preferably from 1 to 3 carbon atoms, and an acyloxy group having 1 to 10 carbon atoms, preferably from 1 to 3 carbon atoms, and a is a number having a value of from 1 to 3. In a preferred embodiment, a is 3 and Y is an alkoxy group, preferably a methoxy or a ethoxy group.

The copolycarbonate having hydroxyl groups at its terminals are diols and representative examples of such copolycarbonate diols are represented by the formula:

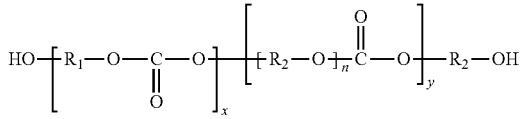

wherein $R_1$, $R_2$ and n are as defined above, and wherein x and y are chosen in such a way that the molar ratio of x:y is between from about 1:9 to about 9:1 and the molecular weight of the copolycarbonate diol is from about 500 to about 10K, preferably from about 1 to about 2K with respect to polystyrene standard.

The copolycarbonate diols of the invention can be prepared by the condensation reaction of an alicyclic diol and a polyether with ethylene carbonate as the carbonate source, or other methods that are known to those skilled in the art. Suitable alicyclic diols include, but are not limited to, cyclohexanedimethanol (CHDM) and tricyclodecanedimethanol (TCDDM). Suitable polyethers include polypropylene glycol (PPG) and polyethylene glycol (PEG). Preferably, the polyether has a molecular weight of from about 300 to about 3000.

The copolycarbonate diols of the invention can be further silylated, either fully or partially. Silylation of the hydroxyl-terminated copolycarbonates can be accomplished by reacting the copolycarbonate diol with an isocyanatosilane. Suitable isocyanatosilanes are those of the general formula:

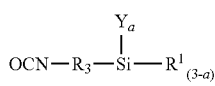

wherein $R_3$ is a divalent alkylene group of from 1 to 10, preferably from 1 to 3 carbon atoms, $R^1$ is a monovalent hydrocarbon residue having 1 to 10, preferably from 1 to 3 carbon atoms, each Y is independently a member selected from the group consisting of a halogen atom, an alkoxy group having 1 to 10, preferably 1 to 3 carbon atoms, an acyloxy group having 1 to 10, preferably 1 to 3 carbon atoms, and a is a number having a value of from 1 to 3. In a preferred embodiment, a is 3 and Y is an alkoxy group, preferably a methoxy or a ethoxy group. In one embodiment, $R_3$ is a divalent propyl group.

Examples of such isocyanatosilane for use in the silylation procedure are α-isocyanatomethyltrimethoxysilane, β-isocyanatoethyltrimethoxysilane, γ-isocyanatopropyltrimethoxysilane, α-isocyanatomethyltriethoxysilane, β-isocyanatoethyltriethoxysilane, and γ-isocyanatopropyltriethoxysilane.

In one embodiment, the silylation of the hydroxyl-terminated copolycarbonates herein can be substantially complete, i.e., essentially no hydroxyl groups will be present following silylation. In another embodiment, silylation will be incomplete, or partial. In the case of incomplete silylation, levels of silylation of not more than about 95 molar percent, and advantageously, not more than 90 molar percent, of the total hydroxyl groups present in the copolycarbonate is generally suitable and can be achieved by appropriate adjustment of the amounts of isocyanatosilane being reacted for a given hydroxyl-terminated copolycarbonate.

In another embodiment, the present invention provides polyurethanes derived from the reaction of at least one copolycarbonate diol of the invention with at least one polyisocyanate.

The isocyanates used to prepare polyurethanes of the invention are organic isocyanates and include any of the known and conventional organic polyisocyanates, especially organic diisocyanates. Preferably, the polyisocyanate is a diisocyanate represented by the formula OCN—$R_4$—NCO, wherein $R_4$ is selected from

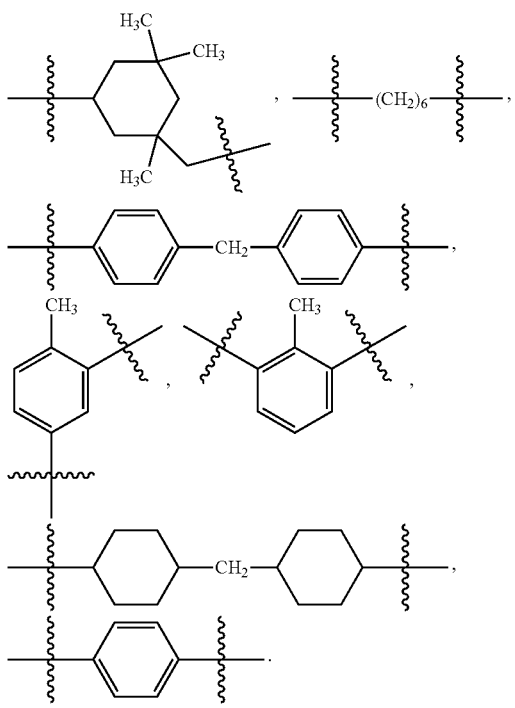

The polyurethane prepolymer may be prepared by mixing the hydroxy-terminated polymer and organic isocyanate together at ambient temperature and pressure, although the rate of the reaction is significantly increased if the temperature of the reaction mixture is raised to a higher temperature, for example, a temperature between 60-100° C. and/or in the presence of organo-metallic catalysts such as tin based catalysts (dibutyltin dilaurate (DBTDL)).

The polyurethane may be hydroxyl-terminated or isocyanate-terminated. A molar ratio of NCO to OH from about 1.1 to about 4.0, depending on the selection of the particular copolycarbonate diol, is used to provide isocyanate-terminated polyurethane prepolymers. A molar ratio of NCO to OH from about 0.3 to about 0.95, and more preferably from about 0.5 to about 0.90, depending on the specific copolycarbonate diol, is used to provide hydroxyl group-terminated polyurethane prepolymers. Preferably, the polyurethane is hydroxy-terminated.

Silylation of the isocyanate-terminated polyurethane described herein can be accomplished by reacting the polyurethane with a silane possessing at least one hydrolyzable group and at least one functionality which is reactive for isocyanate, i.e., an active hydrogen-containing group such as hydroxyl, carboxylic acid, mercapto, primary amino or secondary amino. Advantageously, the silane is a primary or secondary aminosilane of the general formula:

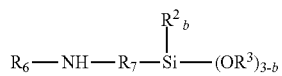

wherein $R_6$ is hydrogen or an alkyl group of from 1 to 10 carbon atoms, $R_7$ is a divalent alkylene group of from 1 to 10 carbon atoms, $R^2$ and $R^3$ each independently is an alkyl group of from 1 to 6 carbon atoms or an aryl group of from 6 to 8 carbon atoms, and b has a value of 0, 1 or 2. Preferably, b is 0, $R_7$ is a divalent alkylene group of 1 to 3 carbon atoms, $R^3$ is an alkyl group of from 1 to 3 carbon atoms.

Examples of aminosilanes for use in the silylation procedure herein are 3-aminopropyltrimethoxysilane, 3-aminopropyltriethoxysilane, 4-amino-3,3-dimethylbutyltrimethoxysilane, 4-amino-3,3-dimethylbutyldimethoxymethylsilane, N-methyl-3-amino-2-methylpropyltrimethoxysilane, N-ethyl-3-amino-2-methylpropyltrimethoxysilane, N-ethyl-3-amino-2-methylpropyldiethoxymethylsilane, N-ethyl-3-amino-2-methylpropyltriethoxy silane, N-ethyl-3-amino-2-methylpropylmethyldimethoxysilane, N-butyl-3-amino-2-methylpropyltrimethoxysilane, N-ethyl-4-amino-3,3-dimethylbutyldimethoxymethylsilane and N-ethyl-4-amino-3,3-dimethylbutyltrimethoxysilane, and the like.

Silylation of the hydroxyl-terminated polyurethane described herein can be accomplished by reacting the polyurethane with an isocyanatosilane. Suitable isocyanatosilanes are those of the general formula:

wherein $R_8$ is a divalent alkylene group of from 1 to 10, preferably 1 to 5 carbon atoms, $R^4$ and $R^5$ each independently is an alkyl group of from 1 to 6 carbon atoms or an aryl group of from 6 to 8 carbon atoms, and c has a value of 0, 1 or 2. Preferably, c is zero, $R^5$ is a C1-C5, preferably C1 to C3 alkyl group, $R_8$ is a divalent alkylene group having from 1 to 3 carbon atoms.

As in the case of the silylated copolycarbonate diol described above, the silylation of the hydroxy-terminated or isocyanate-terminated polyurethane prepolymers herein can be partially or substantially complete, i.e., essentially no hydroxyl and/or isocyanate groups will be present following silylation.

In another embodiment of the invention, there is provided a coating composition comprising a copolycarbonate of the invention. Preferably, in addition to the copolycarboante of the invention, the coating composition also contains an organoalkoxysilane and/or a partial condensate thereof, and colloidal silica.

Copolycarbonates suitable for use in the coating composition of the invention include copolycarbonate diols and their partially or fully silylated derivatives as described above, polyurethanes derived from the copolycarbonate diols of the invention, preferably hydroxy-terminated polyurethane, and the partially or fully silylated derivatives of these polyurethanes.

Organoalkoxysilanes which can be used in the coating compositions are included within the formula $(R_9)_d Si(OR_{10})_{4-d}$, wherein $R_9$ is a C1-C6 monovalent hydrocarbon radical, preferably a C1-C4 alkyl radical, more preferably a methyl or ethyl group. $R_{10}$ is an $R_9$ or a hydrogen radical and d is 0, 1 or 2. Preferably, the organoalkoxysilane is methyltrimethoxysilane, methyltriethoxysilane, or a mixture thereof which can form a partial condensate. Additional organoalkoxysilanes are for example, tetraethoxysilane, ethyltriethoxysilane, diethyldiethoxysilane, tetramethoxysilane, and dimethyldimethoxysilane.

Colloidal silica is known in the art and commercially available. Dispersions include, for example, those under the trademarks of LUDOX® (DuPont), SNOWTEX® (Nissan Chemical), BINDZIL® (Akzo Nobel) and NALCOAG® 1034A (Nalco Chemical Company).

Optionally, the coating composition of the invention includes a condensation catalyst to reduce the cure time of the hardcoat composition. The cure catalyst is not particularly limited. Preferably, it is a thermal cure catalyst tetrabutylammonium carboxylate of the formula: $[(C_4H_9)_4N]^+[OC(O)-R]^-$, wherein R is selected from the group consisting of hydrogen, alkyl groups containing about 1 to about 8 carbon atoms, and aromatic groups containing about 6 to 20 carbon atoms. In preferred embodiments, R is a group containing about 1 to 4 carbon atoms, such as methyl, ethyl, propyl, butyl, and isobutyl. Exemplary catalysts are tetra-n-butylammonium acetate (TBAA), tetra-n-butylammonium formate, tetra-n-butylammonium benzoate, tetra-n-butylammonium-2-ethylhexanoate, tetra-n-butylammonium-p-ethylbenzoate, and tetra-n-butylammonium propionate. In terms of effectiveness and suitability for the present invention, the preferred condensation catalysts are tetra-n-butylammonium acetate and tetra-n-butylammonium formate, with tetra-n-butylammonium acetate being most preferred.

The composition of the invention can also include surfactants as leveling agents. Examples of suitable surfactants include fluorinated surfactants such as FLUORAD™ from 3M Company of St. Paul, Minn., and silicone polyethers under the designation Silwet® and CoatOSil® available from Momentive Performance Materials, Inc. of Albany, N.Y. and BYK available from BYK Chemie USA of Wallingford, Conn.

The composition can also include UV absorbers such as benzotriazoles. Preferred UV absorbers are those capable of co-condensing with silanes. Such UV absorbers are disclosed in U.S. Pat. No. 4,863,520, U.S. Pat. No. 4,374,674, U.S. Pat. No. 4,680,232, and U.S. Pat. No. 5,391,795 which are herein incorporated by reference in their entireties. Specific examples include 4-[gamma-(trimethoxysilyl) propoxyl]-2-hydroxy benzophenone and 4-[gamma-(triethoxysilyl) propoxyl]-2-hydroxy benzophenone and 4,6-dibenzoyl-2-(3-triethoxysilylpropyl) resorcinol. When the preferred UV absorbers that are capable of co-condensing with silanes are used, it is important that the UV absorber co-condenses with other reacting species by thoroughly mixing the coating composition before applying it to a substrate. Co-condensing the UV absorber prevents coating performance loss caused by the leaching of free UV absorbers to the environment during weathering.

The composition can also include antioxidants such as hindered phenols (e.g. IRGANOX® 1010 from Ciba Specialty Chemicals), dyes (e.g. methylene green, methylene blue and the like), fillers and other additives.

The coating compositions of the invention can be prepared by mixing components in any order. Alternatively, the coating compositions of the invention can be prepared by post addition of component to a silicone thermal hardcoat composition, such as PHC 587, available from Momentive Performance Materials, Inc. of Albany, N.Y. When this preparation method is chosen, it is important to allow time for the silane moieties of the copolycarbonate, if present, to co-condense with the partially condensed mixture of the silicone hardcoat composition. The pH of the resulting mixture may be further adjusted. An appropriate amount of solvent(s) may also be necessary to adjust solid contents.

Suitable organic solvents for the coating composition of the invention include but are not limited to C1 to C4 alkanol, such as methanol, ethanol, propanol, isopropanol, butanol; glycols and glycol ethers, such as propyleneglycolmethyl ether and mixtures thereof.

Optionally, additional water-miscible polar solvents, such as diacetone alcohol, butyl cellosolve, and the like can be included in minor amounts, usually no more than 20% by weight of the solvent system.

After adjustment with solvent, the coating compositions of this invention preferably contain from about 10 to about 50% by weight solids, most preferably, about 20% by weight of the total composition. The nonvolatile solid portion of the coating formulation is a mixture of colloidal silica and the partial condensate of organoalkoxy silane. In the preferred coating compositions herein, the partial condensate is present in an amount of from about 40 to about 75% by weight of total solids, with the colloidal silica being present in the amount of from about 25 to about 60% by weight based on the total weight of the solids within the alcohol/water co-solvent.

Although a primer may be used if desired, advantageously, the hardcoat compositions of the invention can be suitably coated directly onto a substrate such as plastic or metal surface without the requirement of a primer based on the surprising discovery that the copolycarbonates of the invention can be used as an adhesion promoter in the silicone hardcoat compositions.

Examples of such plastics include synthetic organic polymeric materials, such as polycarbonates, acrylic polymers, for example, poly(methylmethacrylate), and the like; polyesters, for example, poly(ethylene terephthalate), poly(butylene terephthalate), and the like; polyamides, polyimides, acrylonitrile-styrene copolymer, styrene-acrylonitrile-butadiene terpolymers, polyvinyl chloride, polyethylene, and the like.

The coating composition can be applied onto the substrate by any of the well known methods such as spraying, dipping, roll coating and the like. It can then be cured thermally to provide a cured coating, which exhibits improved flexibility while maintains the abrasion resistance as compared to conventional silicone hardcoats.

The following examples are intended to illustrate, but in no way limit the scope of the present invention. All percentages are by weight based on the total weight of the composition and all temperatures are in degrees Celsius unless explicitly stated otherwise.

EXAMPLES

Example 1

Preparation of CHDM-PPG Copolycarbonate Diol

General procedure: Cyclohexanedimethanol (CHDM), polypropylene glycol (PPG-425) and ethylene carbonate in a molar ratio of 1:1:3 were charged to a three-neck round bottom flask equipped with a stirrer, and a distillation set up connected to a vacuum pump. To the flask, was added 0.5 mol % of anhydrous sodium acetate. The reaction mixture was heated to a temperature of 140° C. under atmospheric pressure for 30 minutes. Subsequently, vacuum was applied progressively (till 5 mbar) to remove the by-product (ethylene glycol) while simultaneous raising the temperature to 210° C. during a period of five hours. After the reaction was completed, the residual were removed from the reaction mixture by exposing it to high vacuum to provide the desired product, CHDM-PPG copolycarbonate diol. Characterization of the product is shown below:

| Sample | Mn (GPC) | PDI (GPC) | OH number ($^{31}$PNMR) mg KOH/g | Viscosity (cP) |
|---|---|---|---|---|
| CHMD-PPG425 copolycarbonate diol | 1846 | 1.42 | 100.9 | 6977 |

The $^1$H NMR spectra of CHDM-PPG copolycarbonate diol is shown in FIG. 1.

Example 2

Preparation of Silylated CHDM-PPG Copolycarbonate Diol

Figure 2:
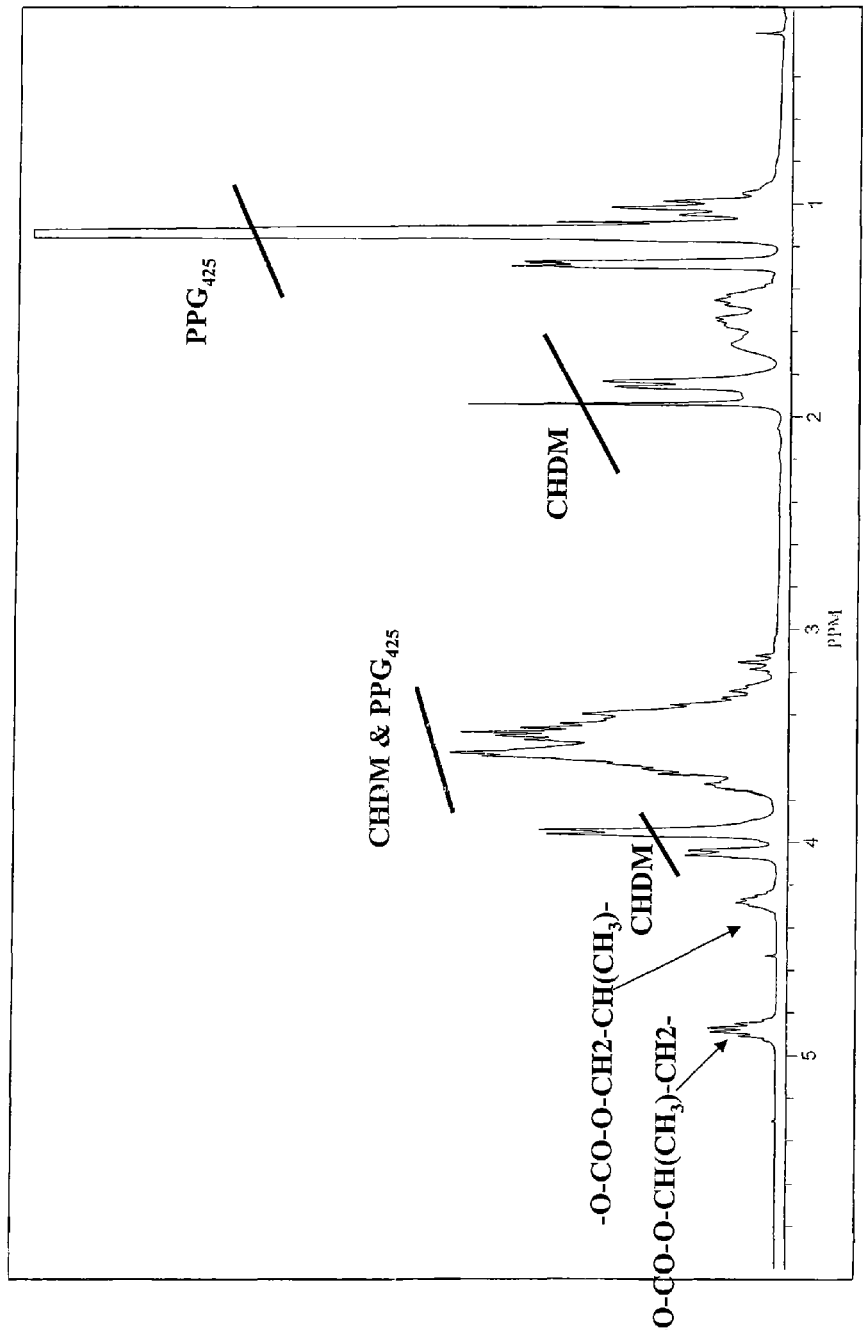
FIG. 2 is a $^1$H NMR spectra of silylated CHDM-PPG copolycarbonate diol

General procedure: The reaction can be performed without solvent. Copolycarbonate diol and 3-isocyanatopropyltrimethoxysilane in a 1:2 molar ratio were charged into a round bottom flask. To the above mixture, was added catalytic amount of dibutyltin dilaurate catalyst (10-50 ppm). The reaction mixture was heated to 80-85° C. with stirring. The reaction was monitored by FTIR spectra for the disappearance of —NCO peak. Upon the completion of the reaction (2-5 hours), the reaction mixture was cooled to room temperature. In cases where the reactions were conducted in a solvent (toluene/DMF), the solvent was removed from the reaction mixture by vacuum. The $^1$H NMR of silylated CHDM-PPG copolycarbonate diol is shown in FIG. 2.

Example 3

Preparation of Polyurethane from Copolycarbonate Diol

General procedure: Hydroxyl terminated or NCO terminated polyurethane prepolymers were synthesized by chain extension of hydroxyl terminated copolycarboante diol with diisocyanate. Depending on the ratio of NCO/OH, isocyanato or hydroxyl terminated polyurethanes were made. The reaction can be performed both with and without solvent. In cases where the reactions were conducted in a solvent (toluene/DMF), the solvent was removed from the reaction mixture under the vacuum at the completion of the reaction. CHDM-PPG425 copolycarbonate diol and isophoronediisocyanate in a molar ratio of 1 to 0.5 were charged into a three-neck round-bottom flask. The reaction mixture was mixed thoroughly and catalytic amount of dibutyltin dilaurate catalyst (10 to 20 ppm) was added. Subsequently, the reaction mixture was stirred and heated to 85 to 90° C. and kept at that temperature. The progress of the reaction was monitored by FTIR spectra for the disappearance of NCO peak. At the completion of the reaction, the reaction mixture was cooled to room temperature. GPC analysis of the product showed that the $M_n$ was 4168 and PDI was 1.67.

Example 4

Preparation of Silylated Polyurethane Derived from CHDM-PPG Copolycarbonate Diol Polyurethane prepared from example 3 above and 3-isocyanatopropyltrimethoxy silane in a molar ratio of 1:2 were charged into a round-bottom flask. To the mixture was added 10 to 20 ppm of dibutyltin dilaurate. The reaction was heated to 80 to 85° C. with stirring. The reaction was monitored by FTIR spectra, for the disappearance of —NCO peak. Upon completion of the reaction after 2 to 5 hours, the reaction mixture was cooled down to room temperature to produce the desired product.

Example 5

Solubility of Copolycarbonates

The solubility characteristics of several homo-polycarbonates and copolycarbonates is presented in Table 1 below. As shown in the table, the CHDM and TCDDM homopolycarbonates are insoluble in the alcoholic solvents tested. TCDDM-PPG (1:1) copolycarbonate is soluble in selected alcoholic solvents. While the CHDM-PPG (3:1) copolycarbonate is insoluble in the tested alcoholic solvents, CHDM-PPG (1:1) as well as CHDM-PPG (1:3) copolycarbonate are found to be soluble in all alcoholic solvents tested. The test results demonstrate the importance of hydrophobic (CHDM/TCDDM)-hydrophilic (PPG) balance to achieve the desired solubility in the alcoholic solvents.

TABLE 1

| | Solubility Data | | | | |
|---|---|---|---|---|---|
| Composition | Methanol | Isopropanol | n-butanol | Methanol + n-butanol (1:1) | Isopropanol + n-butanol (1:1) |
| CHDM polycarbonate[1] (comparative) | Insoluble | Insoluble | Insoluble | Insoluble | Insoluble |
| TCDDM polycarbonate[2] (comparative) | Insoluble | Insoluble | Insoluble | Insoluble | Insoluble |
| CHDM-PPG425 copolycarbonate[3] (75:25) | Insoluble | Insoluble | Insoluble | Insoluble | Insoluble |
| CHDM-PPG425 copolycarbonate[3] (50:50) | Soluble | Soluble | Soluble | Soluble | Soluble |

TABLE 1-continued

Solubility Data

| Composition | Methanol | Isopropanol | n-butanol | Methanol + n-butanol (1:1) | Isopropanol + n-butanol (1:1) |
|---|---|---|---|---|---|
| CHDM-PPG425 copolycarbonate[3] (25:75) | Soluble | Soluble | Soluble | Soluble | Soluble |
| TCDDM-PPG425 copolycarbonate[4] (50:50) | Insoluble | Insoluble | Soluble | Soluble | Soluble |

[1]Homopolymer derived from CHDM and ethylene carbonate
[2]Homopolymer derived from tricyclodecanedimethanol (TCDDM) and ethylene carbonate
[3]The copolymer derived from CHDM, PPG425 and ethylene carbonate with varying molar percentage of CHDM and PPG425.
[4]The copolymer derived from TCDDM, PPG425 and ethylene carbonate where the molar ratio of TCDDM to PPG425 is 1:1.

Example 6

Hardcoat Composition Containing the Copolycarbonates of the Invention

Oligomers as described in Table 2 below were added individually to hardcoat composition PHC587, available from Momentive Performance Materials Inc., which contains methyltrimethoxysilane, colloidal silica, silylated hydroxybenzophenone, tetrabutylammonium acetate, water, isopropanol, methanol and acetic acid but without acrylic polyol adhesion promoter to provide hardcoat compositions of the invention. It was observed that these hardcoat compositions of the invention could be made with oligomers 1 to 10 without any severe issues, as these oligomers were soluble in the solvent mixtures of PHC587. The prepared hardcoat compositions were stable during storage under laboratory conditions for a few months.

The resulting coating compositions of the invention were coated uniformly onto unprimed polycarbonates and cured thermally under standard set of conditions. The cured coatings on the polycarbonate substrates appeared visually uniform, without any surface defects. The performance of these coatings were evaluated and the results are shown in Tables 3-5.

As it is evident from table 3, the coatings resulted from the oligomer 1 to 10 containing PHC 587 compositions have similar prolonged adhesion (Kärcher test and Tape test data), scratch resistance (steel wool test), and abrasion resistance (Δhaze values) performances as compared to the coating obtained from acrylic polyol adhesion promoter-containing standard PHC 587 composition. Interestingly, the values of % elongation to crack observed for the oligomer 1 to 10 containing hardcoats are mostly higher than that observed for standard PHC 587 hardcoat, indicating that the addition of adhesion promoter according to the present invention to a hardcoat composition improves the flexibility of the resulting hardcoats.

Table 4 indicates that PHC 587 without any adhesion promoter (reference) exhibits poor performance in the Kärcher test. In addition, the reference sample failed (F4) within 5 Kärcher test cycles. In comparison, the addition of oligomer-1 at a loading of 7.5% to the PHC 587 composition leads to the adhesion performance (remained F0 even after 10 Kärcher test cycles) of the cured coating. Both lower (2.5 and 5%) and higher loading (10%) of oligomer-1 in the PHC 587 led to a relatively inferior adhesion performance. The addition of oligomer-3 in the PHC 587 silicone hardcoat mostly led to a good adhesion performance, both in 5 and 10 CF Kärcher tests, irrespective of its loading level from 2.5 to 7.5%.

The data in Table 5 indicates that the hardcoats resulting from the oligomer-1 and 3-containing composition are susceptible to prolonged weathering, as evidenced from the relatively higher yellowness index (YI) and haze values, in comparison to that observed for standard PHC 587 hardcoat. The percentage transmission values, however, are remained unaffected, similar to that observed for standard PHC 587 hardcoat.

TABLE 2

| Oligomer | Description |
|---|---|
| 1 | CHDM-PPG425 copolycarbonate diol of example 1 |
| 2 | Fully silylated oligomer 1 prepared according to example 2 (100 mole % of the hydroxyl groups in oligomer 1 were silylated with isocyanatopropyltrimethoxysilane) |
| 3 | Partially silylated oligomer 1 prepared according to example 2 (60 mole % of the hydroxyl groups in oligomer 1 were silylated with isocyanatopropyltrimethoxysilane) |
| 4 | Polyurethane of example 3 |
| 5 | Fully silylated polyurethane of example 4 |
| 6 | TCDDM-PPG425 copolycarbonate diol prepared according to example 1 except CHDM was changed to TCDDM |
| 7 | Fully silylated oligomer 6 prepared according to example 2 (100 mole % of the hydroxyl groups in the oligomer 6 were silylated with isocyanatopropyltrimethoxysilane) |
| 8 | Partially silylated oligomer 6 prepared according to example 2 (60 mole % of the hydroxyl groups in oligomer 6 were silylated with isocyanatopropyltrimethoxysilane) |
| 9 | Polyurethane prepared according to example 3 except that the diol used was TCDDM-PPG425 (oligomer 6) |
| 10 | Fully silylated polyurethane prepared according to example 4 except that the polyurethane used was oligomer 9 |

TABLE 3

| PHC587[1] (wt %[9] of MTMS[8]) | Oligomer | Amount of the Oligomer (wt %)[9] | Kaercher Test[2] | Δ haze[3] 500 cycles | Elongation to crack[4] (%) | Steel wool resistance[5] | Tape test (10d)[6] |
|---|---|---|---|---|---|---|---|
| Reference[7] (comparative) 100 | | 0 | F4 | 4.5 | 1.5 | OK | OK |
| 90 | 1 | 10 | | | Cracks | | |
| 95 | 1 | 5 | F0 | 5.1 | 1.8 | OK | OK |
| 90 | 2 | 10 | F0 | 6.2 | 2.1 | OK | OK |
| 90 | 3 | 10 | F0 | 6.3 | 2.3 | OK | OK |
| 95 | 4 | 5 | F0 | 4.5 | 1.5 | OK | OK |
| 90 | 4 | 10 | F0 | 2.0 | 1.8 | OK | OK |
| 95 | 5 | 5 | F0 | 1.6 | 1.8 | OK | OK |
| 90 | 5 | 10 | F0 | 1.6 | 1.8 | OK | OK |
| 95 | 6 | 5 | F0 | 1.8 | 1.8 | OK | OK |
| 90 | 6 | 10 | F0 | 1.8 | 1.9 | OK | OK |
| 95 | 7 | 5 | F0 | 2.3 | 1.8 | OK | OK |
| 90 | 7 | 10 | F0 | 2.4 | 1.8 | OK | OK |
| 95 | 8 | 5 | F0 | 1.6 | 1.8 | OK | OK |
| 90 | 8 | 10 | F0 | 2.4 | 1.8 | OK | OK |
| 95 | 9 | 5 | F0 | 2.3 | 1.8 | OK | OK |
| 90 | 9 | 10 | F0 | 2.5 | 1.8 | OK | OK |
| 95 | 10 | 5 | F0 | 1.8 | 1.7 | OK | OK |
| 90 | 10 | 10 | F0 | 2.2 | 1.7 | OK | OK |

[1]PHC 587 without adhesion promoter
[2]Measured according to DIN 55662:2009
[3]Taber abrasion was measured according to ASTM D-1044. The abrasion resistance was determined by the haze change after a predetermined taber cycles. Low delta haze indicates good abrasion resistance
[4]Three point bending test to measure elongation to crack (stress of outer strain) according to DIN EN ISO 178 standard
[5]The steel wool resistance of the sample was examined by using steel wool to rub the sample. OK means that no scratch or acceptable scratch was caused by rubbing the sample with steel wool.
[6]Adhesion measured according to ASTM D3359.
[7]Standard PHC 587 containing acrylic polyol adhesion promoter
[8]MTMS refers to methyl trimethoxy silane
[9]The percentage is based on the total weight of MTMS and the oligomer.

TABLE 4

| PHC 587[1] (wt %[5] of MTMS[4]) | Oligomer | Amount of the Oligomer (wt %)[5] | Karcher test[2] (5CF) | Karcher test[2] (10 CF) |
|---|---|---|---|---|
| Reference 1[3] (comparative) 100 | | 0 | F4 | — |
| Reference 2[4] (comparative) 100 | | 0 | F4 | — |
| 97.5 | 1 | 2.5 | F0 | F3 |
| 95 | 1 | 5 | F0 | F2 |
| 92.5 | 1 | 7.5 | F0 | F0 |
| 90 | 1 | 10 | F5 | — |
| 97.5 | 3 | 2.5 | F0 | F0 |
| 95 | 3 | 5 | F0 | F0 |
| 92.5 | 3 | 7.5 | F0 | F0 |
| 90 | 3 | 10 | F0 | F2 |

[1]PHC 587 without adhesion promoter
[2]Measured according to Dm 55662: 2009, after 5 and 10 CF cycles.
[3]Standard PHC 587 containing acrylic polyol adhesion promoter
[4]PHC 587 without any adhesion promoter
[5]MTMS refers to methyl trimethoxy silane
[6]The percentage is based on the total weight of MTMS and the oligomer.

TABLE 5

| Time in | | PHC 587[5] with 2.5 wt % of Oligomer 1 | | | PHC 587[5] with 2.5 wt % of Oligomer 3 | | | PHC 587 Std[6] (Comparative) | | |
|---|---|---|---|---|---|---|---|---|---|---|
| hrs[1] | kj | y.i.[2] | Haze[3] | Transm.[4] | y.i.[2] | Haze[3] | Transm.[4] | y.i.[2] | Haze[3] | Transm[4] |
| 0 | 0 | −0.77 | 0.38 | 90.2 | −1.07 | 0.38 | 90.3 | 0.45 | 0.2 | 89.6 |
| 550 | 1490 | −1.1 | 0.36 | 90.6 | −1.36 | 0.75 | 90.5 | 0.14 | 0.31 | 90.1 |
| 1100 | 2980 | 0.03 | 1.02 | 90.7 | −0.25 | 0.59 | 90.9 | 0.1 | 0.42 | 90.2 |
| 1650 | 4470 | 0.59 | 1.01 | 90.5 | 0.52 | 1.3 | 90.5 | 0.21 | 0.63 | 90.3 |
| 2200 | 5960 | 0.54 | 0.46 | 90.5 | 0.58 | 0.75 | 90.8 | 0.27 | 0.42 | 90.3 |
| 2750 | 7450 | 1.39 | 0.59 | 90.8 | 1.16 | 0.99 | 91.1 | 0.88 | 0.67 | 89.9 |
| 3300 | 8940 | 2.88 | 1.49 | 90.9 | 3.07 | 2.71 | 90.3 | 1.68 | 0.82 | 89.9 |

[1]ASTM G155 mod (0.75 W/m2 @ 340 nm)
[2]According to ASTM E313
[3]According to ASTM D 1003
[4]According to ASTM D1003
[5]PHC 587 without adhesion promoter
[6]PHC 587 with standard acrylic polyol adhesion promoter While the invention has been described above with references to specific embodiments thereof, it is apparent that many changes, modifications and variations can be made without departing from the invention concept disclosed herein. Accordingly, it is intended to embrace all such changes, modifications, and variations that fall within the spirit and broad scope of the appended claims.

What is claimed is:

1. A copolycarbonate comprising repeating units A and B respectively of the formulae:

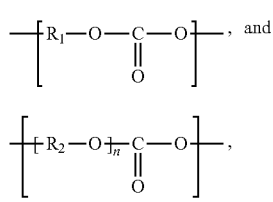

wherein the molar ratio of units (A) to units (B) is in the range of from about 9:1 to about 1:9, and wherein $R_1$ is a divalent C8 to C12 alicyclic group, $R_2$ is a divalent group selected from the group consisting of ethylene and propylene, n is an integer ranging from 4 to 40.

2. The copolycarbonate of claim 1 comprising terminal groups, wherein each terminal group is a member selected from the group consisting of a hydroxyl group, and a substituted silyl group of the formula

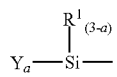 (Formula I)

wherein $R^1$ is a monovalent hydrocarbon residue having 1 to 10 carbon atoms, each Y is independently a member selected from the group consisting of a halogen atom, an alkoxy group having 1 to 10 carbon atoms, and an acyloxy group having 1 to 10 carbon atoms, and a is a number having a value of from 1 to 3.

3. The copolycarbonate of claim 2 wherein substantially all of the terminal groups are hydroxyl groups.

4. The copolycarbonate of claim 2 wherein substantially all of the terminal groups are silyl groups of Formula (I).

5. The copolycarbonate of claim 1 wherein each occurrence of $R_1$ is independently

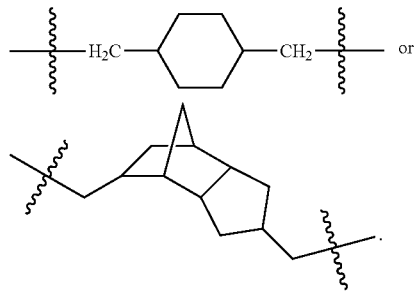

6. A polyurethane obtained by reaction of a polyisocyanate and a copolycarbonate diol of claim 3.

7. The polyurethane of claim 6 wherein the polyisocyanate is a diisocyanate represented by

OCN—$R_4$—NCO, wherein $R_4$ is selected from

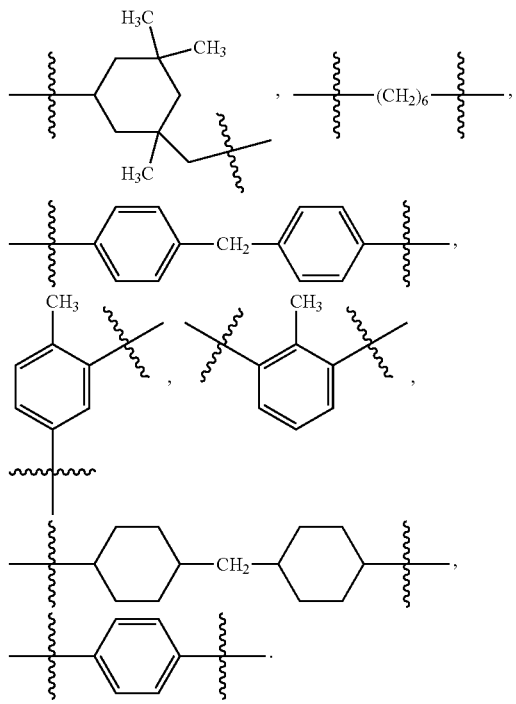

8. The polyurethane of claim 6 wherein the polyurethane is hydroxyl-terminated or isocyanate-terminated.

9. The polyurethane of claim 8 wherein the polyurethane is silylated with at least one compound selected from the group consisting of aminosilane and isocyanatosilane.

10. The polyurethane of claim 9 wherein the aminosilane is of the general formula:

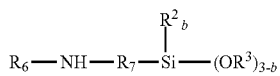

wherein $R_6$ is hydrogen or an alkyl group of from about 1 to about 10 carbon atoms, $R_7$ is a divalent alkylene group of from about 1 to about 10 carbon atoms, $R^2$ and $R^3$ each independently is an alkyl group of from about 1 to about 6 carbon atoms or an aryl group of from about 6 to about 8 carbon atoms, and b has a value of 0, 1 or 2; and
the isocyanatosilane is of the general formula:

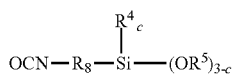

wherein $R_8$ is a divalent alkylene group of from about 1 to about 10 carbon atoms, $R^4$ and $R^5$ each independently is an alkyl group of from about 1 to about 6 carbon atoms or an aryl group of from about 6 to about 8 carbon atoms, and c has a value of 0, 1 or 2.

11. A coating composition comprising a copolycarbonate of claim 1.

12. The coating composition of claim 11 further comprising: a partial condensate of an organoalkoxysilane; and colloidal silica.

13. The coating composition of claim 12 wherein the organoalkoxysilane is of the formula $(R_9)_d Si(OR_{10})_{4-d}$, wherein $R_9$ is a C1-C6 monovalent hydrocarbon radical, $R_{10}$ is an $R_9$ or a hydrogen radical, and d is 0, 1 or 2.

14. The coating composition of claim 13 wherein the organoalkoxysilane is selected from the group consisting of methyltrimethoxysilane, methyltriethoxysilane, tetraethoxysilane, ethyltriethoxysilane, diethyldiethoxysilane, tetramethoxysilane, dimethyldimethoxysilane, and combinations thereof.

15. The coating composition of claim 12 wherein the composition additionally comprises a UV light absorbing agent.

16. A coating composition comprising the polyurethane of claim 6.

17. A polymeric substrate having at least one surface coated with a cured composition of claim 11.

18. The polymeric substrate of claim 17 wherein the substrate comprises polycarbonate.

19. A polymeric substrate as in claim 17 wherein a primer layer is disposed between the polymeric substrate and the coating.

20. A polymeric substrate according to claim 17 wherein the coating is directly disposed on the surface of the polymeric substrate.

21. A polymeric substrate having at least one surface coated with a cured composition of claim 16.

* * * * *